B. SENEFF.
Improvement in Harvester Droppers.

No. 124,166. Patented Feb. 27, 1872.

Witnesses:
G. Mathys
C. A. Pettit

Inventor:
Byron Seneff
Per _____ Attorneys.

124,166

UNITED STATES PATENT OFFICE.

BYRON SENEFF, OF CHILLICOTHE, OHIO.

IMPROVEMENT IN HARVESTER-DROPPERS.

Specification forming part of Letters Patent No. 124,166, dated February 27, 1872.

Specification describing a Dropping Attachment for Harvesters, invented by BYRON SENEFF, of Chillicothe, in the county of Ross and State of Ohio.

The invention will first be fully described, and then clearly pointed out in the claim.

Figure 1:
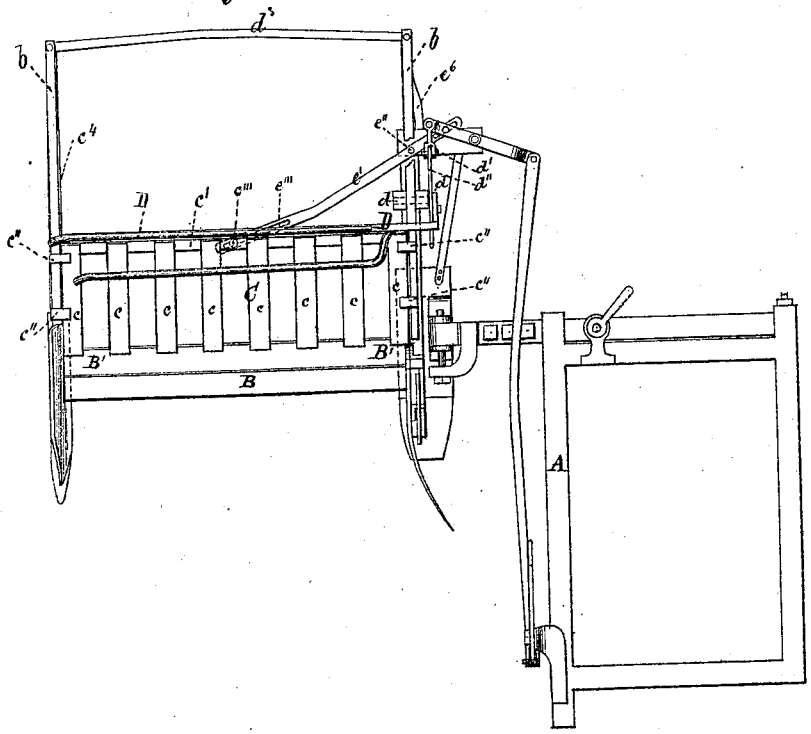
Figure 2:
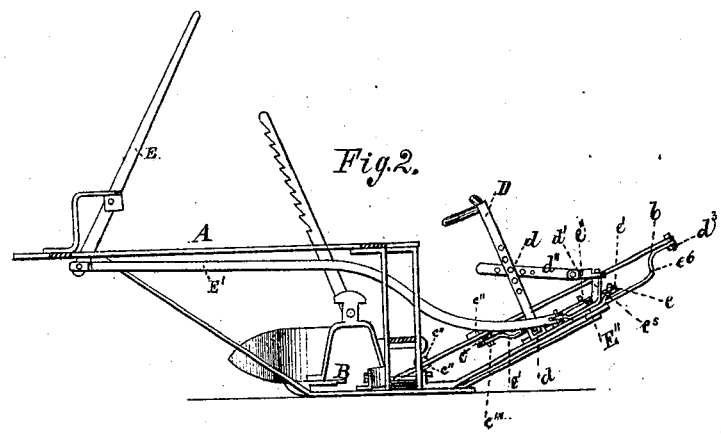

Figure 1 is a plan view, and Fig. 2 is a longitudinal section of my invention.

A represents the frame of a harvester running-gear, and B the finger-bar, which is hinged thereto in the usual manner. $b\ b$ are two rods attached to the shoes, and arranged at an obtuse angle to the plane of the finger-bar B, and braced by bars $c^4\ d^3\ e^6$. C is a dropper, formed of a series of bars or narrow plates, $c$, attached rigidly to a bar $c'$, and provided with lips $c''\ c''$, by which they are enabled to slide on the bars $b\ b$. D is a bifurcated grain-rest, pivoted at $d$, to enable it to be moved in the arc of a circle. After the dropper C has received the grain and is moved up the inclined bars $b\ b$, and the grain is dropped therefrom through the space between it and the cutter-bar, the grain-rest D receives the grain that falls during the absence of the dropper, and holds it in a backwardly-oblique position until the dropper returns. It then retires and allows said grain to fall into the dropper. E is a lever, connected with pitman E' and lever E''. This lever E'' has a prong, $e$, to which is pivoted horizontally the lever $e^1$, which is itself pivoted at $e^2$, and has a long slot, $e'''$, in which moves the pin $c'''$ of the dropper. The lever E'' also has another raised and bent prong, $e^5$, which is connected by a bifurcated and horizontally-pivoted bar, $d^1$, and a vertically-pivoted bar, $d^2$, with the grain-rest D. By this construction the driver may remain on his seat, and, by operating the single lever E, move the dropper and grain-rest in different directions simultaneously.

Having thus described all that is necessary to a full understanding of my invention, what I esteem to be new, and desire to protect by Letters Patent, is—

1. The dropper-supporting frame, consisting of the inclined bars $b\ b$, attached to the shoes, and the braces $c^4\ d^3\ e^6$, combined as described with a dropper, C, having lips $c''\ c''$, so that said dropper may slide thereon in the manner set forth.

2. The mechanism for simultaneously operating the grain-rest D and dropper C, consisting of the bars $d'\ d''$, pin $c'''$, pitman E', lever E'', having prong $e$, and slotted lever $e'$, all arranged as described.

BYRON SENEFF.

Witnesses:
SOLON C. KEMON,
CHAS. A. PETTIT.